United States Patent [19]

Ishikawa et al.

[11] Patent Number: 5,218,527
[45] Date of Patent: Jun. 8, 1993

[54] ELECTRONIC CASH REGISTER SYSTEM WITH TRANSMISSION MEANS TO TRANSMIT COOKING INITIATION INSTRUCTIONS TO A KITCHEN AT SUITABLE TIMES FOR SERVING ARTICLES OF A MEAL IN A DESIRED SEQUENCE

[75] Inventors: Kenichi Ishikawa; Seiji Fuyama, both of Yokohama, Japan

[73] Assignee: Matsushita Electric Industrial Co., Ltd., Osaka, Japan

[21] Appl. No.: 768,530

[22] PCT Filed: Feb. 18, 1991

[86] PCT No.: PCT/JP91/00198
  § 371 Date: Oct. 4, 1991
  § 102(e) Date: Oct. 4, 1991

[87] PCT Pub. No.: WO91/13412
  PCT Pub. Date: Sep. 5, 1991

[30] Foreign Application Priority Data
  Feb. 20, 1990 [JP] Japan .................. 2-038605

[51] Int. Cl.⁵ .................. G06F 1/12; G06F 15/22; A01K 43/00
[52] U.S. Cl. .................. 364/405; 364/401; 426/233
[58] Field of Search .......... 364/405, 401, 513, 400; 426/233, 243; 99/327, 332, 328, 333, 335; 235/375, 383

[56] References Cited

U.S. PATENT DOCUMENTS

| | | | |
|---|---|---|---|
| 4,919,950 | 4/1990 | Mak | 426/233 |
| 4,922,435 | 5/1990 | Cahlander et al. | 364/513 |
| 5,057,331 | 10/1991 | Levinson | 426/243 |
| 5,096,725 | 3/1992 | Kim | 426/233 |

FOREIGN PATENT DOCUMENTS 58-8373  1/1983  Japan .
1-284964  11/1989  Japan .
1-293500  11/1989  Japan .

Primary Examiner—Robert A. Weinhardt
Assistant Examiner—Xuong Chung
Attorney, Agent, or Firm—Stevens, Davis, Miller & Mosher

[57] ABSTRACT

An electronic cash register system which comprises a control means having a cooking instruction transmission means (18) to transmit cooking instructions to a kitchen at suitable timing, whereby the cooking time, constituent materials and serve timing of each article can be controlled and efficient serving can be realized.

4 Claims, 4 Drawing Sheets

LIST OF REFERENCE NUMBERS IN DRAWING

1······ECR (ELECTRONIC CASH REGISTER)

2······SLIP PRINTER

3······MAIN DISPLAY

4······SUB-DISPLAY

10······TRANSMISSION LINE

11······MENU REGISTRATION MEANS

12······SLIP ISSUANCE MEANS

13······POSITION-IN-CHARGE EXTRACTION MEANS 14,17,20······MEMORY MEANS

15······TRANSMISSION DESTINATION DECISION MEANS

16······SERVE TIMING EXTRACTION MEANS

18······COOKING INSTRUCTION TRANSMISSION MEANS

19······COOKING TIME EXTRACTION MEANS

21······COOKING INSTRUCTION TIMING DECISION MEANS

22······TEMPORARILY HOLDING MEANS

23······TIMER MEANS ered menu to give preferable cooking instructions to the cook.

In accordance with the present invention, the above object is attained by providing an electronic cash register system which comprises registration data memory means for storing therein data such as the cooking time, serving timing, constituent materials, etc. of respective articles as meals, another registration data memory means for storing data such as the cooking time, cooking positions, etc. of the respective constituent materials, and control means for controllably giving cooking instructions to a cook in suitable timing.

In accordance with the present invention, the ECR system is arranged so as to control the issuance of the cooking instructions on the basis of the cooking time, constituent materials, serving timing, etc. of the respective articles as well as the necessary cooking time, cooking positions, etc. of the respective constituent materials. Accordingly, various defects, which have so far been caused by the cook's judgement of the cooking start timing, etc. of the respective articles, can be easily improved and therefore highly efficient cooking and service can be realized.

BEST MODE FOR CARRYING OUT THE INVENTION

Figure 1:
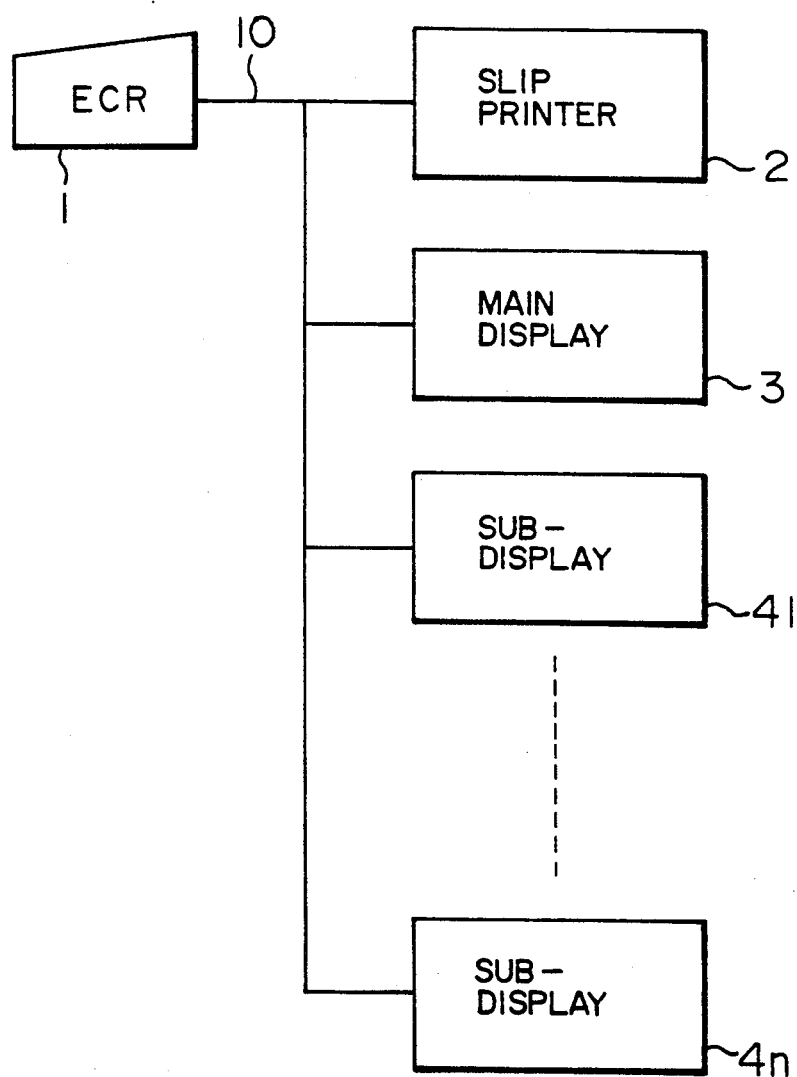
FIG. 1 schematically shows a general arrangement of an electronic cash register system in accordance with an embodiment of the present invention.

Referring to FIG. 1, there is schematically shown a general arrangement of an electronic cash register system in accordance with an embodiment of the present invention.

The arrangement of FIG. 1 includes an ECR 1, an order slip printer 2 for issuing an order slip, a main display 3, and sub-displays $4_1$ to $4_n$ which are connected through a transmission line 10 to the ECR 1.

Figure 2:
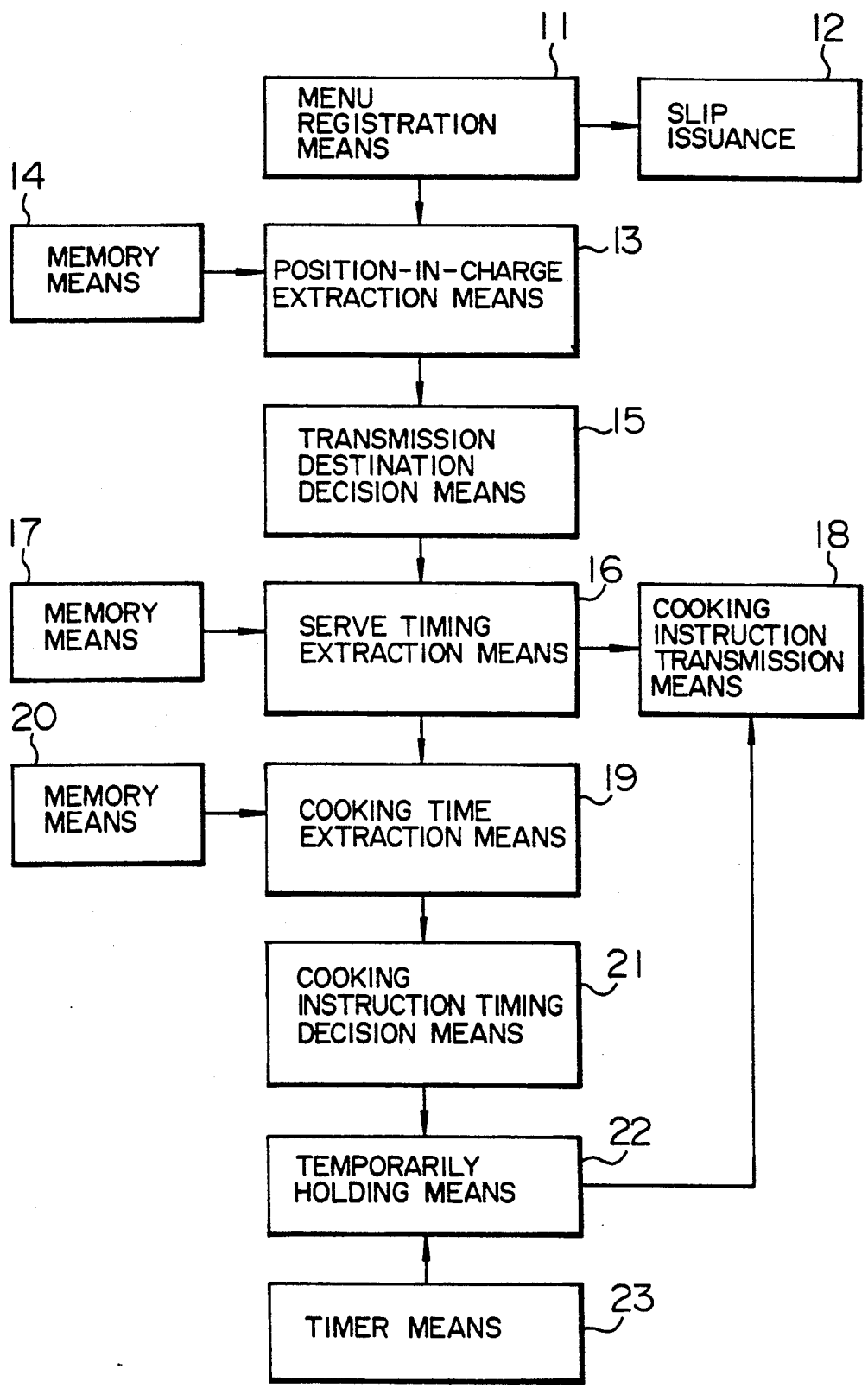
FIG. 2 is a block diagram of schematic arrangement of a major part of the system.

FIG. 2 is a block diagram showing the arrangement of a major part of the ECR 1.

The arrangement of FIG. 2 includes a menu registration means 11 for registering therein an entered order menu, slip issuance means 12 for issuing an order slip to a customer, a position-in-charge extraction means 13 for extracting a corresponding position in charge from the contents previously stored in a memory means 14, and a transmission destination decision means 15 for deciding which one of the displays for cooking instructions should be transmitted to on the basis of the extracted data of the position-in-charge extraction means 13.

Further included in the arrangement of FIG. 2 are a serve timing extraction means 16 for extracting a serve timing of each article from the contents previously stored in a memory means 17, a cooking instruction transmission means 18 for transmitting a cooking instruction to a corresponding one of the displays, a cooking time extraction means 19 for extracting cooking time for each article or each material from the contents previously stored in a memory means 20, a cooking-instruction timing decision means 21 for deciding the transmission timing of the cooking instruction of each

ELECTRONIC CASH REGISTER SYSTEM WITH TRANSMISSION MEANS TO TRANSMIT COOKING INITIATION INSTRUCTIONS TO A KITCHEN AT SUITABLE TIMES FOR SERVING ARTICLES OF A MEAL IN A DESIRED SEQUENCE

TECHNICAL FIELD

The present invention relates to an electronic cash register (referred to as ECR, hereinafter) system for use in food-service or foodcatering business, in particular, in restaurant business.

BACKGROUND ART

There has been conventionally well known an ECR system for use in food-service business that, in a restaurant for example, articles such as dishes ordered by a customer for a meal (sometimes referred to as articles, hereinafter) are registered as a menu in the ECR so that the ECR sends a cooking instruction on the basis of the registered menu to a display or a printer installed in the kitchen of the restaurant, whereby cooks prepare these dishes by predetermined recipe according to the cooking instruction to serve the meal ordered by the customer.

Figure 4:
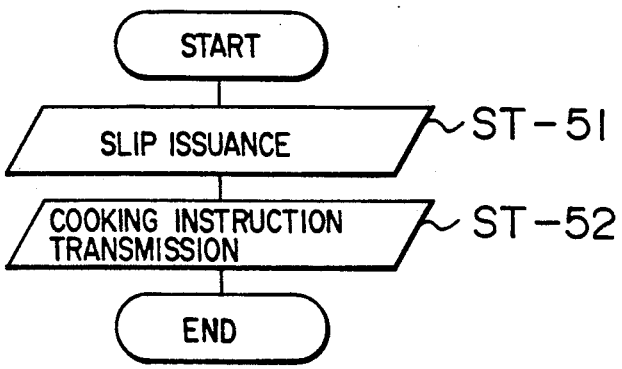
FIG. 4 is a flowchart for explaining the specific operation of a prior art electronic cash register system.

FIG. 4 is a flowchart for explaining the operation of such a prior art ECR system used as above.

In more detail, with the prior art ECR system, when dish articles ordered by a customer are entered in the ECR system, the system first issues a customer order slip in step ST-51 and then sends to the kitchen cooking instructions for all articles ordered by the customer at one time in step ST-52.

The above prior art ECR system, which issues a customer order slip and then sends to the kitchen cooking instructions for all articles ordered by the customer at one time, however, has a problem that, when a cook tries to provide the respective dishes to the customer in their best state, he personally must judge the cooking start time of the respective dish articles. As a result when he wrongly judges the cooking start time, the respective dishes are delayed to be served or deteriorated in quality.

More specifically, in such a case, the customer often complains by saying, "We ordered our dishes at the same time, but the dish for my companion is not served yet", "since you served my child's dish is delayed, he or she became fretful", "your served dishes are cold", "among the foods placed on the plate, the hamburger is warm enough but the garnishings are cold", or "the soup or salad to be served first was served together with the main dish."

The cook, on the other hand, also has complaints such as "when I have too many orders, I cannot correctly judge the cooking start time of the respective order articles", "since it takes great experience to determine the cooking start time an experienced, a cook such as a part time cook cannot judge it", and "since the cooking start time is determined by a human, his fatigue or misjudgement might produce an error."

DISCLOSURE OF INVENTION

It is an object of the present invention to provide an electronic cash register system which solves the above problems in the prior art and can automatically judge the cooking start timing of respective articles of the article, and a temporarily holding means 22 for holding each cooking instruction until the transmission timing decided by the cooking-instruction timing decision means 21 is met based on a timer means 23.

Explanation will next be made of the operation of the embodiment of the system.

Figure 3:
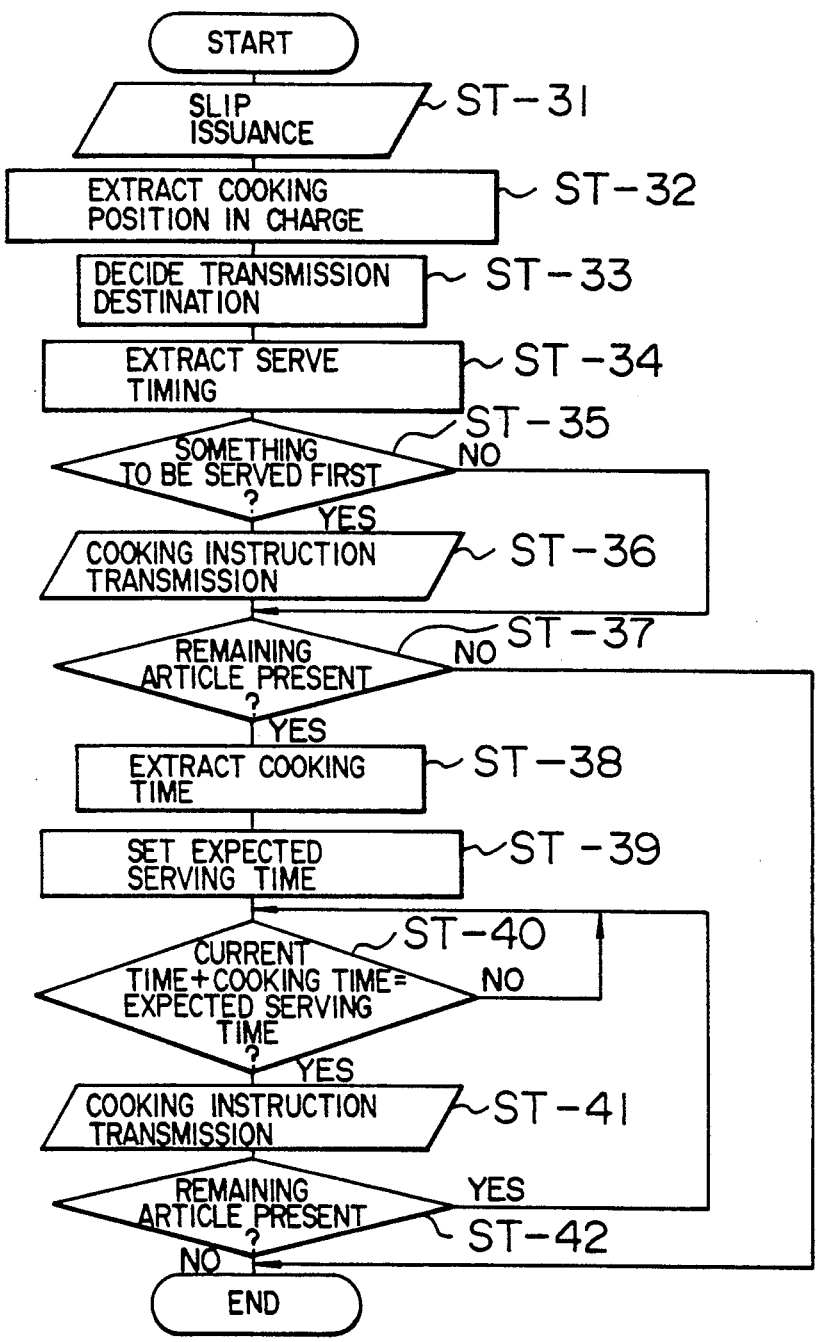
FIG. 3 is a flowchart for explaining the specific operation of the system.

Shown in FIG. 3 is a flowchart for explaining the specific operation of the present embodiment.

More specifically, when an ordered menu of articles, such as dishes ordered by a customer, is registered in the ECR 1 by the menu registration means 11, the ECR 1 first causes the slip issuance means 12 to issue a customer order slip in step ST-31, the position-in-charge extraction means 13 to search and extract cooking positions in charge for the menu on the basis of the contents of the memory means 14 in step ST-32, and the transmission destination decision means 15 to select sub-displays in charge from ones located in the respective cooking positions to be transmitted with the cooking instruction in a step ST-33. In this case, all the cooking instructions are transmitted to the main display.

The service timing extraction means 16 searches and extracts a service timing for each article from the contents of the memory means 17 in step ST-34 and then detects whether or not the ordered menu contains articles to be served first (for example, hors d'oeuvre like soup, or salad or the article specified by the customer) in step ST-35. If the ordered menu contains such articles, the cooking instruction transmission means 18 transmits the cooking instruction to the main display and also to the sub-displays located in the cooking position in charge in step ST-36.

Subsequently, in step ST-37, it is detected whether or not there remains any unserved articles in the ordered menu. When there are any unserved articles, the cooking time extraction means 19 searches and extracts the cooking time of each unserved article and its constituent materials from the contents of the memory means 20 in step ST-38, the cooking-instruction timing decision means 21 sets a prearranged service time on the cooking finish time of the article requiring the longest cooking time in the remained articles in the ordered menu in step ST-39, and then the temporarily holding means 22 with the timer means 23 temporarily holds the respective cooking instructions until the timing based on the set time.

Thereafter, when a sum of the current time and the cooking time of each article reaches the aforementioned prearranged service time in step ST-40, the temporarily holding means 22 releases to the transmission means 50 each cooking instruction from holding. In step ST-41 on the basis of the detection of the presence or absence of the remaining articles in step ST-42, the cooking-instruction transmission means 18 transmits the cooking instruction to the main display and also to the sub-displays located in the cooking positions in charge.

That is, since the cooking instruction timing of each article is controlled by means of the ECR 1, the cook is not required to judge the cooking start timing of each article. Accordingly, when the cook prepares the dishes according to the cooking instruction timing commanded by the ECR 1, the cooks cooking efficiency can be made remarkably high, which results in the customer receiving satisfactory service of the ordered articles.

Although the several sub-displays have been used in addition to the general main display in the foregoing embodiment, only the main display may be employed without the sub-displays. Thereby, the electronic cash register system of the invention can be introduced with a small cost even into a relatively small restaurant or a shop employing few cooks.

The sub-displays have been installed in the respective positions where cooking instructions are transmitted in the foregoing embodiment, but the subdisplays may be replaced by printers. In this case, since intended cooking instructions are printed on suitable paper, the cook can confirm the contents of the cooking instructions at any time, for example, after the articles have been served.

INDUSTRIAL APPLICABILITY

In accordance with the present invention, as is clear from the description of the foregoing embodiment, the ECR can control cooking instructions on the basis of such data as the cooking time, constituent materials, serve timing, etc. of each dish as an article and the necessary cooking time, cooking positions, etc. of the respective constituent materials. Thus various defects caused by cook's misjudgement of the cooking start timing, etc. of each article can be easily removed and highly efficient cooking can be realized, the present invention can advantageously realize timely delivery of dishes to satisfy the customer.

We claim:

1. An electronic cash register system for transmitting cooking initiation instructions to a kitchen provided with at least one cooking station, said cooking initiation instructions being transmitted at suitable times for serving articles of a meal in a desired sequence, in accordance with at least one customer order, wherein said articles are chosen by said at least one customer from a group of menu articles, said system comprising:

input means for receiving customer orders and for generating an output representing said customer orders;

transmission means for transmitting cooking initiation instructions to said kitchen;

first registration data memory means for storing information specifying individual menu article cooking times, each of said menu articles comprising at least one constituent material, each of said menu article cooking times constituting a length of time required to cook a menu article;

second registration data memory means for storing information specifying serving time sequences of said menu articles;

third registration data memory means for storing information specifying said at least one constituent material of each of said menu articles;

fourth registration data memory means for storing information specifying individual constituent material cooking times, each of said constituent material cooking times constituting a length of time required to cook a constituent material;

fifth registration data memory means for storing information specifying proper cooking stations for each of said constituent materials; and control means, receiving said output from said input means, for determining individual start times, at which preparation of the at least one constituent material of said articles selected by said at least one customer is to begin at said cooking stations, by obtaining said stored information from said first to fifth registration data memory means and for controlling said transmission means to transmit cooking initiation instructions for each constituent material of each of said articles chosen by said at least one customer to proper cooking stations at said individual start times.

2. An electronic cash register system according to claim 1, wherein each of said menu article cooking times is equal to a cooking time of its constituent material with a longest constituent material cooking time.

3. An electronic cash register system according to claim 1, further comprising:

display means, associated with each of said cooking stations, for displaying said cooking initiation instructions.

4. An electronic cash register system according to claim 1, further comprising:

printer means, associated with each of said cooking stations, for printing said cooking initiation instructions.

* * * * *